United States Patent [19]
Sanadidi et al.

[11] Patent Number: 5,978,576
[45] Date of Patent: *Nov. 2, 1999

[54] COMPUTER PERFORMANCE MODELING SYSTEM AND METHOD

[75] Inventors: M. Yahya Sanadidi, Santa Monica; Martin Cameron Watson, Los Angeles; Richard R. Muntz, Pacific Palisades, all of Calif.

[73] Assignee: NCR Corporation, Dayton, Ohio

[ * ] Notice: This patent is subject to a terminal disclaimer.

[21] Appl. No.: 09/062,252

[22] Filed: Apr. 17, 1998

Related U.S. Application Data

[63] Continuation of application No. 08/577,956, Dec. 22, 1995.

[51] Int. Cl.⁶ ................................................ G06F 9/455
[52] U.S. Cl. ........................................... 395/500.43
[58] Field of Search .......................... 395/500; 364/578

[56] References Cited

U.S. PATENT DOCUMENTS

| | | | |
|---|---|---|---|
| 5,092,780 | 3/1992 | Vlach | 364/578 |
| 5,539,652 | 7/1996 | Tegethoff | 364/578 |

OTHER PUBLICATIONS

Steven Lavenberg "Computer Performance Modeling Handbook" Academic Press, pp. 173–221, 1983.

*Primary Examiner*—Kevin J. Teska
*Assistant Examiner*—Ayni Mohamed
*Attorney, Agent, or Firm*—Gates & Cooper

[57] ABSTRACT

A computer performance modeling system is provided. The modeling system includes a first and a second submodel which simulate system operations of a particular system component in minute and simple detail, respectively. A performance analysis mechanism is operatively coupled to the first and the second submodel to execute a simulation of the particular system component using the first and the second submodel. The performance analysis mechanism has a switching device for switching between the first and the second submodel during the simulation at a predetermined point in the execution of the simulation. In an alternative embodiment, the second submodel derives a specific behavior from simulation statistics collected by the first submodel. Also, the performance analysis mechanism executes a simulation of a system model having several of the particular system components by using a plurality of the first and the second submodels. A method for modeling computer performance also is provided.

6 Claims, 9 Drawing Sheets

CLONE

NOT EXERCISED

UTILIZATION MUST BE ADJUSTED

COMPUTER PERFORMANCE MODELING SYSTEM AND METHOD

This application is a continuation of application Ser. No. 08/577,956, filed Dec. 22, 1995, which application is incorporated herein by reference.

BACKGROUND OF THE INVENTION

1. Field of the Invention

The present invention relates generally to a computer performance modeling system. More particularly, the present invention relates to such modeling systems which use aggregation techniques in a layered system model.

2. Description of Related Art

Massively parallel processors (MPPs) are currently being used in commercial decision-support applications that require large databases. For example, the Teradata DBC/1012 MPP from AT&T Global Information Solutions shown in FIG. 1 has a system architecture which allows up to 1,024 processors, communicating through a proprietary interconnection system (i.e., Ynet). This MPP has two types of processing nodes, including: Interface Processors (IFPs), and Access Module Processors (AMPs). The IFPs use Intel 80386 processors and the AMPs use Intel 80486 processors. Each processor can have up to 8 Megabytes of random access memory (RAM). In addition, each AMP may be equipped with up to four disks. In this MPP, an IFP receives database requests from a host computer system (e.g., an IBM mainframe computer). The IFP parses a request into one or more serial or parallel processing "Steps.@ These Steps are dispatched to one or more AMPs. The AMPs execute the Steps by accessing and/or modifying the databases based upon the particular request Steps received. Upon completion of these Steps, each AMP sends the response to the originating IFP so that the response can be forwarded to the host computer system.

Such MPPs are extremely complex to design, debug, and analyze. Due to the prohibitive cost of maintaining very large systems for the sole purpose of performance measurement, the ability to model such large system performance in a low cost, simple form is of particular interest. Also, a way to gain an in-depth understanding of subsystems interaction and performance sensitivity to various system parameters is needed. Such a MPP performance model also can be used with appropriate modifications to support the performance analysis of future MPPs.

Therefore, a need exists for an MPP system model which can be used to support the performance analysis of both the current system design and suggested upgrades before their installation at customer sites. The MPP system model ideally will fulfill many requirements covering the usual performance analysis tasks: identification of bottlenecks, comparing alternative upgrades suggested by system developers, understanding subsystems interaction, estimation of performance sensitivity to system parameters, etc. In addition, for greater cost savings, the MPP system model should be capable of modeling a 512-processor configuration in a Model Execution Time (MET) to Simulated Database Computer (DBC) Time (SDT) ratio of less than 100:1. Accuracy requirements stipulate that the system model's throughput estimates preferably be within 20% of an actual system throughput and that the system model's response time estimates preferably be within 30% of actual system response time. For greater flexibility and ease of use, at least two levels of users should be supported. In particular, users should have differing user interfaces to support those that will run the model while varying only system parameter values and those that will modify algorithms and system features, in addition to system parameter values.

The present invention provides a solution to this and other problems, and offers other advantages over the prior art.

SUMMARY OF THE INVENTION

To overcome the limitations in the prior art described above, and to overcome other limitations that will become apparent upon reading and understanding the present specification, the present invention discloses a computer-implemented system that relates to a comprehensive model covering the details of the workload, database management, operating system, communication, and hardware features. This model uses analytic or simulation techniques as appropriate. In addition, this model uses cloning and aggregation techniques to allow varying the level of modeling detail from one subsystem to another, and to eliminate duplication of detailed model execution whenever processor environments are essentially similar. Further, this model uses a graphical user interface (GUI) tool as a development platform to ensure ease of building, testing, verification, and modification of the model.

In accordance with a first aspect of the invention, a computer performance modeling system is provided. A first submodel simulates system operations of a particular system component in minute detail. A second submodel simulates system operations of the particular system component in simple detail. The first and the second submodel may simulate system operations such as workload, database management, operating system, communication, and/or hardware features. A performance analysis mechanism, having input ports connected to the first and the second submodel, executes a simulation of the particular system component using the first and the second submodel. The performance analysis mechanism includes a switch for switching between the first and the second submodel during the simulation at a predetermined point in the execution of the simulation.

The first and the second submodel each preferably include substantially similar interfaces to other submodels of a system model such that these other submodels can be designed to pass information between either the first or the second submodel regardless of which submodel is currently being executed during a simulation.

The computer performance modeling system preferably is designed in a layer structure which divides the system model into distinct modules. These layers may include, for example, an application support layer, a systems layer, and a hardware layer.

In this first aspect, the performance analysis mechanism preferably includes a cloning mechanism which uses several submodels in a system model simulation, including the first and the second submodels. The second submodel mechanism acts as a clone by deriving a specific behavior from statistics collected during the simulation of the particular system component when the first submodel is used.

This first aspect of the invention may also be described in reference to a method of modeling computer performance. This method includes the steps of providing a first submodel which simulates system operations of a particular system component in minute detail and providing a second submodel which simulates system operations of the particular system component in simple detail. In addition, a simulation of the particular system component is executed using the first and the second submodel by switching between the first and the second submodels during the simulation at a predetermined point in the execution of the simulation.

In accordance with a second aspect of the invention, an alternative computer performance modeling system is provided. A master submodel simulates system operations of a particular system component in minute detail. Also, two or more clone submodels simulate system operations of the particular system component in simple detail. Each clone submodel derives a specific behavior from simulation statistics collected by the master submodel. These simulation statistics are related to system operations such as workload, database management, operating system, communication, and/or hardware features. A performance analysis mechanism, having input ports connected to the master and the clone submodels, executes a simulation of a system model having a number of the particular system components by using a corresponding number of the clone submodels and at least one master submodel.

Like the first aspect of the invention, the master and the clone submodels in the second aspect of the invention each preferably include substantially similar interfaces to other submodels of a system model such that these other submodels can be designed to pass information between either the master or the clone submodel regardless of which submodel is currently being executed during a simulation. In addition, the computer performance modeling system preferably is designed in a layer structure which divides the system model into distinct modules.

The performance analysis mechanism preferably includes a switch which switches between the master and one of the clone submodels during the simulation at a predetermined point in the execution of the simulation.

This second aspect of the invention may also be described in reference to a method of modeling computer performance. This method includes the steps of providing a master submodel which simulates system operations of a particular system component in minute detail and providing a plurality of clone submodels which simulate system operations of the particular system component in simple detail. Each clone submodel derives a specific behavior from simulation statistics collected by the master submodel. These simulation statistics are related to system operations such as workload, database management, operating system, communication, and/or hardware features. Subsequently, a simulation of a system model is executed having a number of the particular system components by using a corresponding number of the clone submodels and at least one master clone submodel.

These and various other features as well as advantages which characterize the present invention will be apparent upon reading of the following detailed description and review of the associated drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
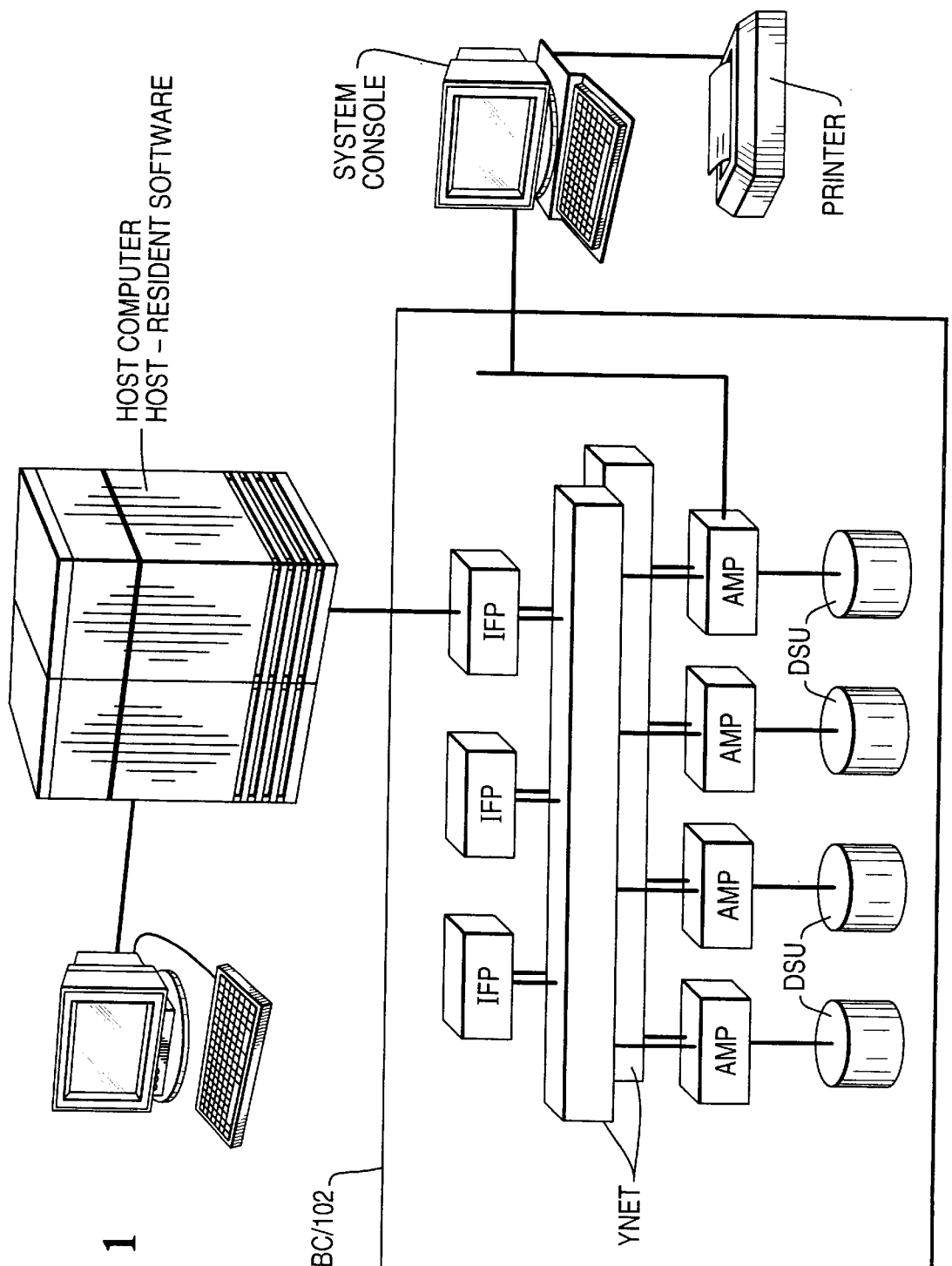
FIG. 1 is a system architecture block diagram of a massively parallel processor (MPP) which may be modeled in accordance with the present invention.
Figure 2:
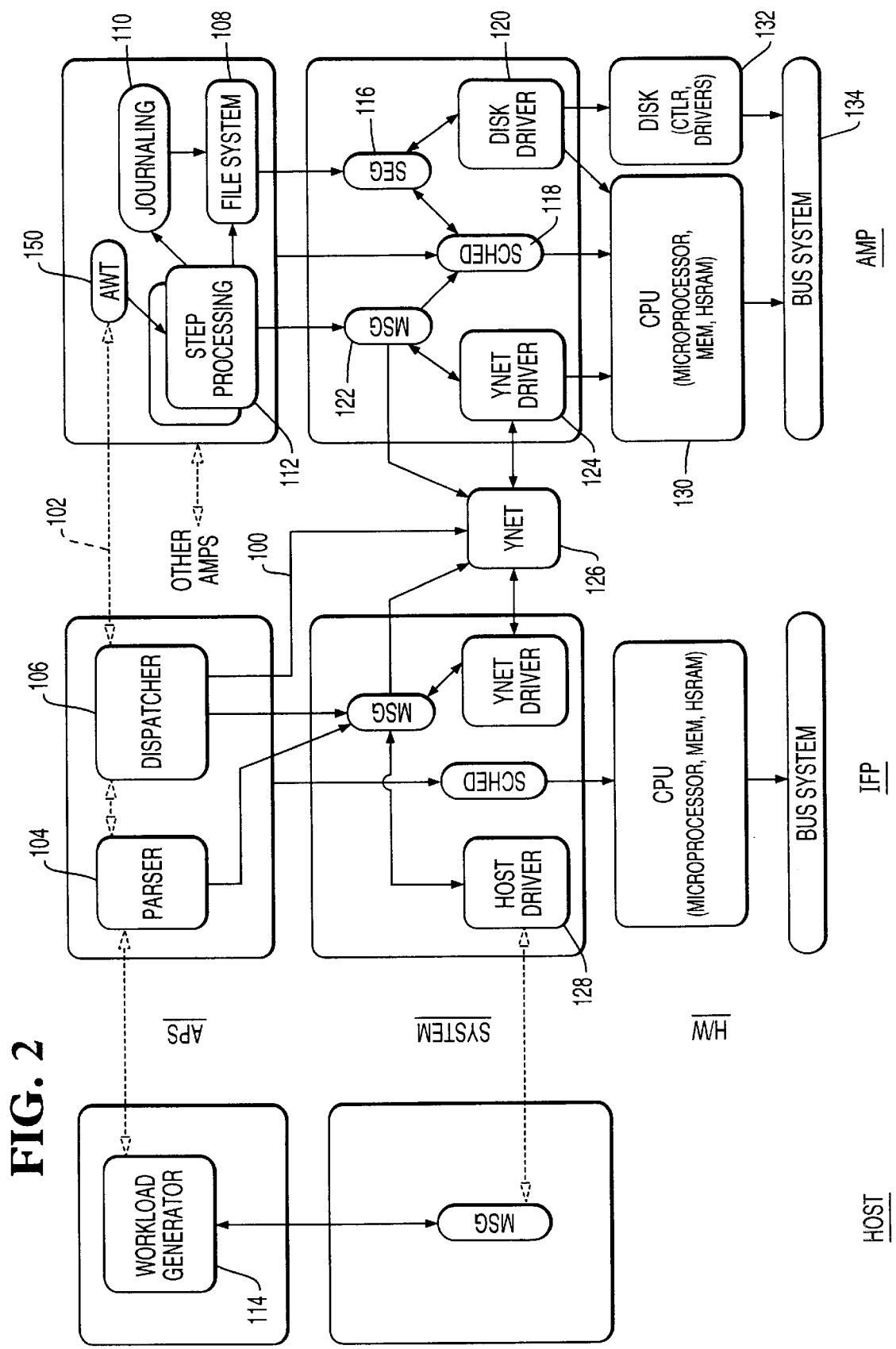
FIG. 2 shows many submodels and their potential interactions with one another in a computer system model in accordance with a preferred embodiment of the present invention.

Layering is a way to modularize the computer system model to make it easier to design, build, and test. Layering is also intended to separate the software submodels from the resource submodels. An advantage of this approach is the ability to modify control algorithms or characteristics of related resources independent of each other. Layering, also, mimics the structure of the actual system which makes the model easier to understand by the actual system developers. FIG. 2 shows many submodels and their potential interactions with one another in a typical computer system model. A solid arrow (e.g., arrows 100) between two submodels represents either a procedure call or a message interface. Dotted arrows (e.g., arrows 102) represent a message interface across processor modules. The model layers are defined below.

The Application Support Layer (APS) submodels represent the database, and such application support functions as the Parser 104 and Dispatcher 106 running on IFPs, as well as the File System 108, Journaling 110, and Step Processing 112 running on AMPs. Also included in this layer is a Workload Generator 114 that represents user applications running on the host system. Submodels of this layer gain access to other system resources via appropriate calls to the Systems Layer submodels.

The Systems Layer submodels represent the operating system and the communication protocols. The Segment (memory management) subsystem 116, Central Processing Unit (CPU) Scheduler 118, and Disk Driver 120 represent operating system functions included in the system model. The Message submodel 122 supports addressing, routing, and session layer functions for intra- as well as interprocessor communications among APS tasks. The Ynet Driver submodel 124 implements the protocols followed by the nodes in accessing the Ynet, while the Ynet submodel 126 represents point-to-point and multicast transmissions on the Ynet. Finally, the Host Driver 128 implements a simplified version of the IFP/Host communication protocol.

The Hardware Layer includes the CPU 130, Memory, Disk 132, and Bus System 134 submodels. These submodels represent the resource characteristics (e.g., speed or available space), and include some low-level operational procedures (e.g., cylinder seek operation on a disk).

A detailed workload model preferably is utilized in the overall system model. At least three data structures and a number of submodels should be included in the workload model. The three structures define the database tables, the database requests and their corresponding Steps, as well as the workload traffic mix. These structures are built from configuration files that provide the appropriate parameter values. A sample of part of a configuration file is shown below in Table 1.

required to build a row in the response set, the number of instructions to qualify a row, the percentage of rows that qualify, the Step message length in bytes, etc. The Traffic Generation Array defines the workload traffic mix in terms of request types, inter-arrival time distribution, request priority, number of sessions generating the requests, etc.

The workload model is capable of supporting both open and closed workload generation modes in the same simulation execution run. In the open mode, a stream of requests is generated following an inter-arrival distribution, independent of the system state. In the closed mode, a number of sessions are assumed to generate requests according to the following protocol. At time zero, each session generates a request. As each response is received at a host, the session then delays for a "think time" and generates a new request. Three configuration files, shown in Table 1, are used to provide the necessary parameter values to build the workload arrays at the beginning of a simulation execution run. The first configuration file provides the table definitions, the

TABLE 1

```
/****            SAMPLE TABLE DEFINITION FROM DATA DICTIONARY FILE              ****/
BEGIN branch                                       /* Define branch                        */
filetype                   - DB_TABLE              /* data base table                      */
rowsize                    - 100
RowsPerAmp         - 3
maxBlksize         - 8192
minBlksize         - 512
incBlksize         - 512
dataSkew                   - 70 40                 /* 70% of rows on 40% of AMPs           */
percentCIresident  - 0                             /* for cloning init, cylinder index block */
percentDBresident  - 0                             /* for cloning init, data block         */
percentCImodified      - 0
percentDBmodified      - 0
fallback               - NONE                      /* No associated fallback table         */
permjournal            - tb_jrnl                   /* Permanent Journaling, tbl name:   tb_jrnl*/
indexlist              - 0                         /* No associated index tables */
END branch
/****            SAMPLE STEP DEFINITION FROM STEPS FILE                         ****/
BEGIN INS_Branch                                   /* Define an Insert step: INS_Branch    */
InputTable                 - Branch                /* Insert into the Branch Table         */
ResponseType               - NOROWS                /* Request does not expect any rows back */
DestAmp                    - HASHED                /* Primary key hashed to idenfity the AMP */
CompletionType             - ONE_COUNT             /* Return a single success message      */
ReadMode                   - UPI                   /* Use the Unique Primary Index         */
PathToBuild                - 21100                 /* Number of instructions to build a row */
PathToQualify              - 0                     /* Num of instr to qualify a row, N/A   */
OutputSize                 - 0                     /* Select's Output row size of qual. row */
RetIndicies                - 0                     /* No index tables to be used in retrieval */
UpdIndicies                - 0                     /* No indexes to update                 */
stepLength                 - 700                   /* Length of Step message               */
/****            SAMPLE REQUEST DEFINITION FROM REQUESTS FILE                   ****/
BEGIN req_tpcb                                     /* Define a request: req_tpcb           */
priority = 2                                       /* DBC work request priority            */
sessions = 1                                       /* # sessions = 1=> Closed workload model */
IntArrDist = UNIFORM 0.0 2.0                       /* For requests, N/A since # sessions > 0 */
BEGIN SEQUENCE                                     /* Define Step execution sequence       */
UPD_Customer, INS_txnHistory, UPD_Branch, UPD_Teller
SEL_Customer
END SEQUENCE
END req_tpcb
```

The Data Dictionary Array defines the set of database tables to be used in a simulation run. Each entry in the Data Dictionary represents a table. The entry specifies the table's type (primary index, permanent journal, secondary index, or spool), number of rows per AMP, number of bytes per row, whether the table requires fall back or permanent journaling, indexing information, and data distribution skew over the AMPs. The Steps Array is a structure that relates each request type to its corresponding Steps. A Step is defined by its type (insert, delete, etc.) and a set of parameters which include the table it refers to, the number of instructions second provides Step definitions, while the third defines the workload to be applied to the system in terms of requests and related statistics.

Figure 3:
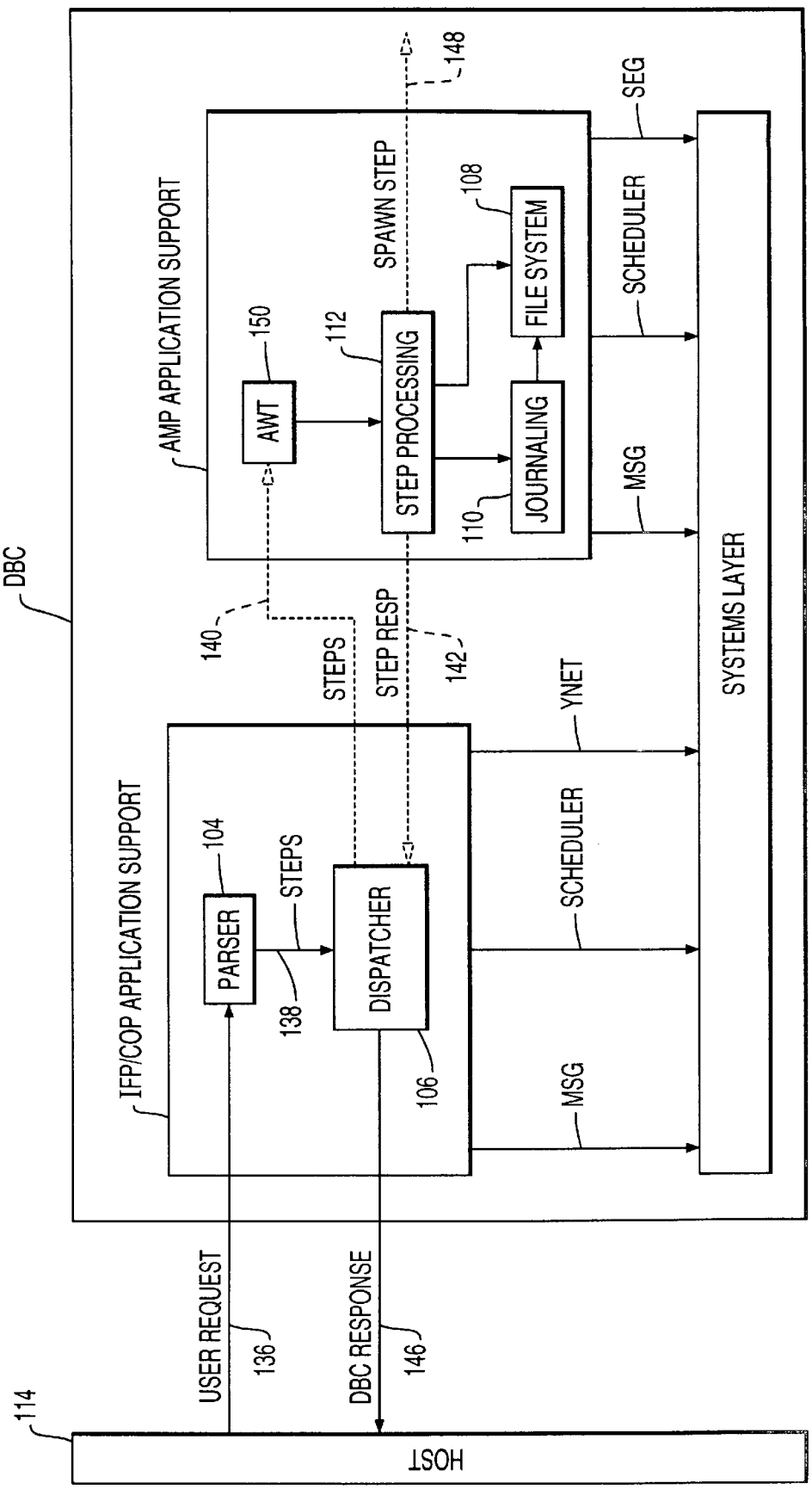
FIG. 3 is a diagram representing workload flow in accordance with the preferred embodiment computer system model shown in FIG. 2.

FIG. 3 is a diagram representing workload flow in accordance with the preferred embodiment computer system model shown in FIG. 2. A number of submodels are directly related to workload generation and processing through the system model. At the host, the one APS submodel is the Workload Generator 114, described below. This APS submodel interacts with IFP Parser 104 and Dispatcher 106 submodels.

The Workload Generation submodel 114 is responsible for generating requests in open or closed mode, and in open mode, according to the request interarrival distribution specified. The Workload Generator 114 forms a request message 136 and sends it to the IFP Parser 104. The parser 104 generates the set of Steps 138 corresponding to the request 136, then sends them to the Dispatcher 106. The latter controls Steps execution by transmitting the Steps 140 (in series or in parallel following the request definition) to the appropriate AMPs for processing.

Once all required responses 142 are received at the Dispatcher 106, it forms a response message 146 that is forwarded to the Workload Generator 114 at the host. As each Step 140 is received at an AMP, it is directed to the appropriate "Step Processing Submodel" 112 that embodies the AMP operations required to process the Step. Step processing submodels 112 preferably are developed and provided for the most common Steps (e.g., retrieve, update, insert, delete, full table scan, and join). It will be appreciated by those skilled in the art that other Steps may be added to the system model by developing corresponding Step processing submodels.

Also, a Step processing submodel 112 may spawn new Steps 148 on other AMPs, depending on the nature of the Step and the tables involved (e.g., like a subroutine program execution call). As an example, if an update Step 112 is performed on a table that requires fall back, a spawned Step 148 is issued to the AMP that holds the fall back data. The AMP receiving a spawned Step 148 sends a response to the originating AMP once it finishes processing the spawned Step 148. The primary AMP, the one that received a Step 112 directly from the Dispatcher 106, sends its response 142 to the Dispatcher 106 after ensuring that all of the Step's processing requirements were satisfied.

The AMP Worker Task (AWT) submodel 150 has the responsibility of processing Steps 140 arriving at an AMP by invoking the appropriate Step Processing submodel 112. It will be appreciated that each AMP may be capable of executing several different Step Processing submodels. An AWT 150 waits for arriving Steps 140 at a well-known mailbox (see discussion below on mailboxes). When a Step 140 arrives, the task 150 forks off a new AWT (unless a specified limit has been reached) to wait for subsequent Steps, identifies the Step type of the work received, then switches to the appropriate Step Processing submodel. Once Step execution is completed by the Step Processing submodel, the AWT 150 sends a "StepOK" message to the Dispatcher 106, signaling successful execution of the Step. The AWT 150 now returns to the mailbox and waits for the arrival of new Steps.

Figure 4:
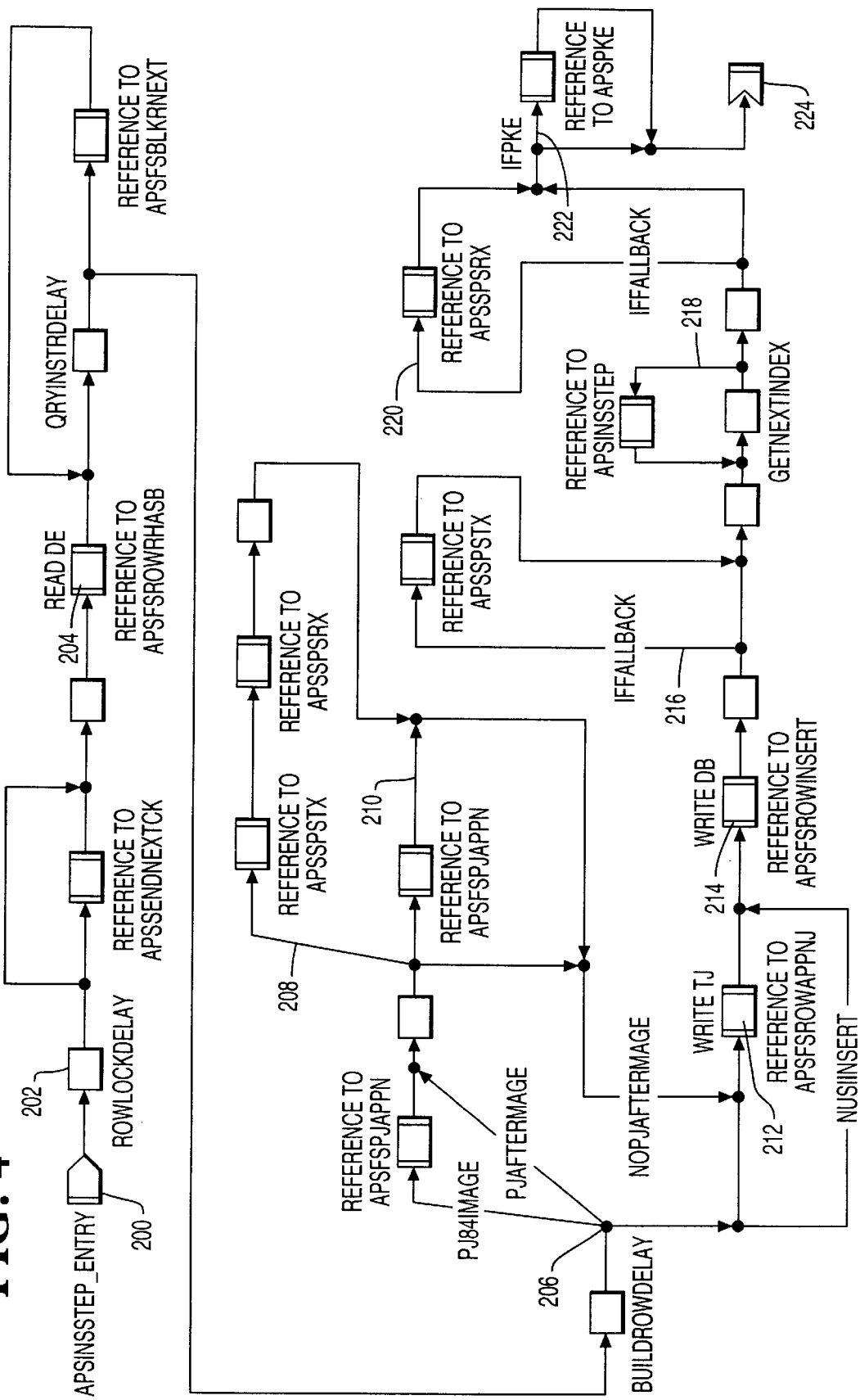
FIG. 4 shows an Insert Step submodel in accordance with the preferred embodiment of the present invention.

As an example of a Step Processing submodel, FIG. 4 shows an Insert Step submodel (steps 200 through 224) in accordance with the preferred embodiment of the present invention. This submodel first acquires a lock for the row being inserted 202, then accesses the Data Block 204 where the row will be inserted. Depending on whether permanent Journaling has been requested 206, the task may update the Permanent Journal (local 210 and/or remote 208). The Transient Journal is always updated 212 and the row is then inserted 214 into the data block. The task may spawn 216 a Step to the fall back AMP, and may update index tables 218 if needed. If a Step was spawned 216 to a fall back AMP, the task waits 220 for a response from that AMP. Upon receipt of the response or if no fall back was spawned 216, the task unlocks the row 222, ending insert Step processing 224.

At the AMPs, the file system 108 and the journaling 110 functions are represented by a set of submodels that closely follow the corresponding functions in the actual system. The Journaling submodels 110 support Transient Journal and Permanent Journal table logging with and without Non-Volatile Memory. Both local and remote Permanent Journal logging are supported.

Several submodels can be built to model the file system 108. Two types of files are distinguished: spool files and permanent tables. Some of the File System submodels 108 may implement table sequential scanning, random access, etc. Others may represent various block manipulations, i.e., inserting, deleting, replacing rows, sorting, etc.

Such major operating system functions as memory management, CPU scheduling 130, and disk I/O management 132 are represented in FIG. 2. Also, congestion control is included. Each simulated processor has an associated control structure which contains its context, allowing an arbitrary number of processors to be represented in a model. The DBC Segment subsystem 116 performs memory management and disk caching functions. It provides its users with the ability to access a segment for read or modification, drop a segment, or queue it for write to disk, etc. The access function allocates memory if the segment is not resident or if it is a new segment. If no memory is available, a Least Recently Used (LRU) oriented replacement policy is adopted to free space by spooling segments to disk when necessary. The Segment 116 submodel captures all of the above capabilities.

Two CPU scheduling policies should be implemented in the system model to represent two concurrent releases of the DBC software. The basic scheduling algorithm preferably is a preemptive priority scheme that attempts to provide tasks with priority p, twice the service rate provided to tasks with priority p-1.

The Disk Driver submodel 120 covers the disk I/O request queue management. An AMP can be configured with up to four disks. The driver model 120 maintains a queue of requests for each drive and attempts to overlap seek operations whenever possible, as in the DBC.

Finally, a congestion control scheme guards against performance deterioration due to AMP overloading. Resource loading thresholds are monitored and congestion is declared if a threshold is exceeded. When congested, an AMP selectively rejects some arriving Steps (those representing new work) while continuing to accept other Steps (those representing the completion of existing work, e.g., end-transaction Steps). The performance model implements the AMP congestion-control scheme.

Intra- and inter- processor, and WP/Host communications protocols are represented in the Message (MSG) submodel 122, the Ynet Driver 124 and Ynet 126 submodels, and the Host Driver submodel 128.

The Message submodel 122 provides user processes (APS processes) with the required addressing and routing functions. Point-to-point and multicast communications between tasks on the same processor or on different processors are supported. AMPs participating in processing a request form a "Dynamic Group,@ allowing multicast messages to be sent to all members of the group. In addition, a small number of static groups are set up at initialization time and remain in the system as long as the system is up (e.g., all AMPs). Communication between tasks is accomplished via "mailboxes.@ Some mailboxes are "well known" and are used by the basic tasks that are likely to be in use all the time (e.g., Dispatcher 106 tasks in an IFP). Other mailboxes, called transient, are allocated, used as necessary, and then released. Messages may be queued at a mailbox waiting for tasks to pick them up. Also, tasks may queue at a mailbox, waiting for message arrivals. A number of addressing classes are provided to support identifying a destination by a processor identifier (ID), by some data kept at a processor (e.g., database table row keys, a group of processors, etc.). Almost all of the functions provided by the Message subsystem 122 of the DBC have been included in the model to ensure that the parallel database communications requirements are supported.

The Ynet interconnection system provides a shared broadcast link that connects all IFPs and AMPs. Its nondestructive collision resolution scheme provides an efficient mechanism for controlling access to the link's bandwidth. The Ynet scheme allows processors to begin transmission at any instant. If more than one transmit occurs at the same time, the Ynet hardware sorts the transmitted messages and the one that sorts lowest is allowed to proceed. The remaining message sources receive a negative acknowledgment and will continuously retry until they are successful. The Ynet communication protocol provides packetizing and reassembly of messages and parity checking for error detection. An "Overrun" occurs when a processor rejects an arriving message because it has no buffer space for the message, or for congestion control.

Figure 5:
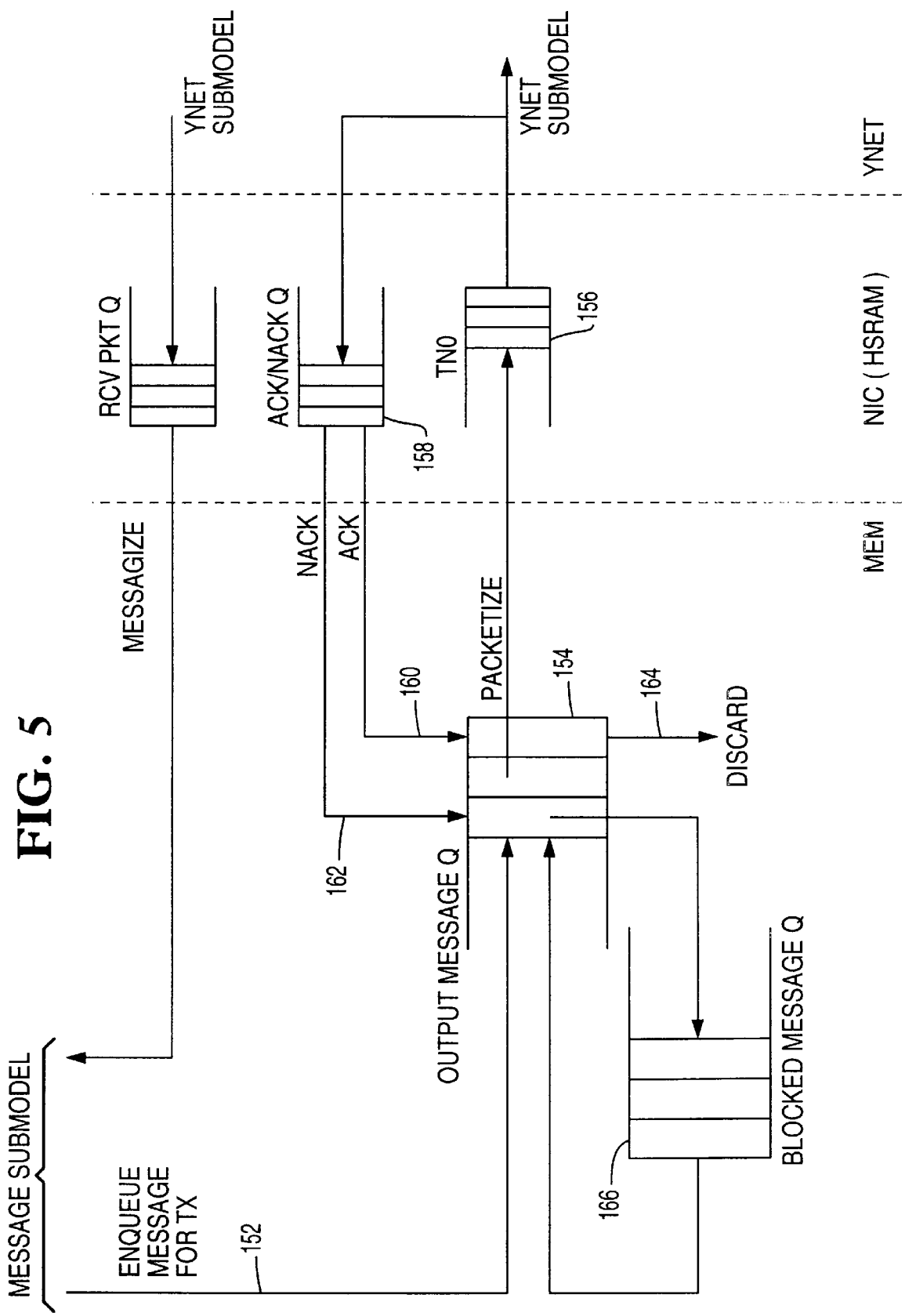
FIG. 5 shows a Ynet Driver submodel queue in accordance with the preferred embodiment of the present invention.
Figure 6:
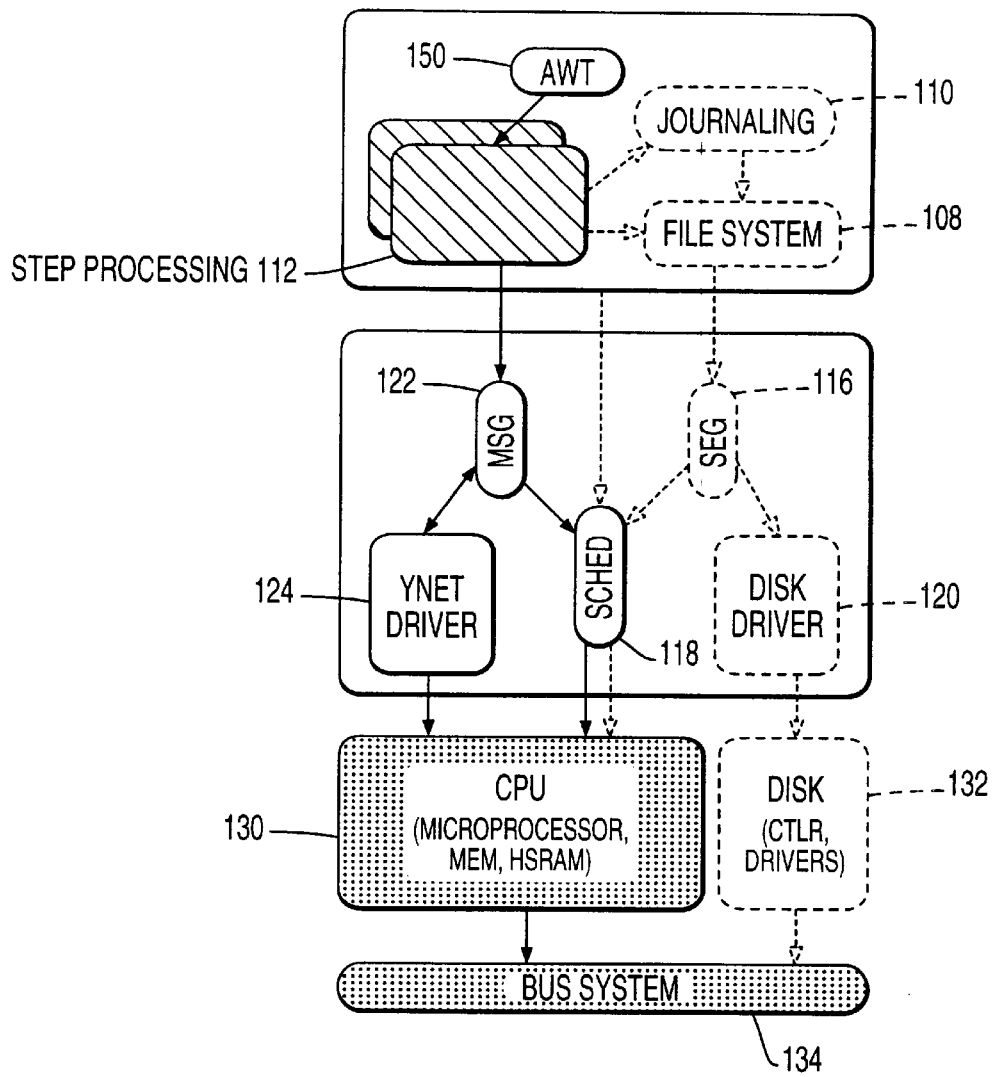
FIG. 6 shows a Step Processing clone in AMPs in accordance with the preferred embodiment of the present invention.
Figure 6:
Figure 6:
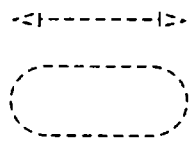
Figure 6:
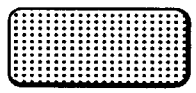

As shown in FIG. 5, the Ynet Driver 124 queues messages 152 for transmission on the Message Output Queue 154. The messages in this queue 154 are served in round-robin fashion. A block from each message is transferred to a hardware queue 156 (called TNO) for transmission. Immediately after a block transmission, the source receives either an Acknowledgment (Ack) 160 or an Overrun 162 on a receive queue 158. If an Ack 160 is received, and the transmitted block was the last block, the message is discarded 164; otherwise, the next block of the message becomes eligible for transmission. If an overrun 160 is received, the message is moved to the Blocked Message Queue 166. After a timeout, the message is returned to the Message Output Queue 154 for retransmission, starting with the block that was rejected.

The simplest of the three layers, the Hardware layer (shown in FIG. 2), includes submodels representing the CPU 130, the Disk complex 132 including the controller and drives, and the system buses 134. The CPU 130 is modeled as a single-queue server with preemptive priority scheduling. The disk controller and drives are represented in the Disk submodel 132. The disk controller receives a command and decodes it to determine the access mode (read or write), then identifies the disk drive and the disk block location. Next, a seek to the cylinder and a rotation to the required sector are completed. The controller is interrupted to handle the transfer of data over the bus system 134. The bus system 134 includes two buses: the System bus and the Teradata bus. The CPU 130, main memory and Disk Controller 132 are connected to the System bus. A coupler connects the System bus to the Terabus to which the Ynet interface boards, Host Channel interface boards, and Non-Volatile Memory boards may be attached. Bus access control and bus delays are captured in the Hardware Layer.

It will be appreciated by those skilled in the art that running a model with the level of detail indicated above can be slow and thus may discourage its use for investigations requiring both feature details and large system size. The following sections detail measures which can be taken to provide the model user with the ability to tailor the level of detail to the particular investigation at hand. For example, by setting appropriate parameter values, the user can request the lumping of requests for CPU execution, thus reducing task switching in the model. Some care should be exercised in forming a particular implementation with the simulation tools (e.g., SES/Workbench) such that the implementations are efficient without undue sacrifice of clarity. In addition, significant simplification and speed can be gained by using cloning and aggregation techniques.

Aggregation techniques have previously been successfully used in reducing the computational complexity of large analytic models. Under certain assumptions, details of a system's state can be aggregated and represented by a much smaller state space. As an example, one might replace a detailed model of a disk with a simple delay distribution. This is an approximation and it is necessary to verify that the results will be within acceptable accuracy. In a simulation, the benefit of the simpler subsystem model is that there are fewer events to process per unit of simulation time. This DBC Performance Analysis system model is a platform which will be used by many different people for different purposes. Depending on the purpose, the detail required for different subsystems will vary. It is beneficial then, for a user to be able to choose either a detailed subsystem model or a simplified version. An additional advantage of having both a simplified and a detail version of a submodel comes in speeding up the initial transient phase of a simulation run. The implementation should allow switching from simplified to the detailed version at an appropriate point in a run. To accomplish this "plug and play" mode, both detailed and simplified models are generally required to have identical interfaces to the remaining parts of the system model.

Aggregation simply refers to substituting a simpler subsystem model for a more detailed model. Often the simpler model is one that the modeler can intuitively justify or has empirically validated. For Markovian models there is some theory that applies in more complex cases which can be useful in guiding intuition. This theory is described in detail in Courtois, ADecomposability: Queueing and Computer System Applications,@ Academic Press, 1977. Cloning can be viewed as a special case of aggregation in which the statistics for the simplified model are obtained in a particular way.

Cloning is a special form of aggregation. It applies to cases where there are many replicas of a subsystem in a model and where the workload is statistically the same on each subsystem. In the preferred embodiment DBC for example, a large number of AMPs may operate with essentially the same workload. It is also possible to represent skew in the data distribution by having a small number of partitions of the AMPS such that all AMPs in the same partition have the same workload and use statistical analysis to get the preferred degree of skew. Such a situation suggests that only one (or perhaps a few) of the subsystems (AMPs in the example) need to be simulated in detail. These Amaster@ AMPs collect statistics that are sampled by the other AMPs (the Aclones@) to determine their behavior. As another example, the disk submodel may be run in full detail in only a few of the AMPs. The disk subsystem models for other AMPs sample the response time statistics gathered at the Amaster@ disk models, implement the disk subsystem as a simple delay server, and avoid running the disk submodel in detail. There are several advantages to cloning over traditional aggregation which stem from the availability of statistics gathered at master submodels. As an example, consider the disk subsystem clones described above. The delays that are experienced at the disk subsystem are workload dependent. In a more traditional implementation of aggregation, the modeler would have to supply some estimate of the disk subsystem delay as a function of workload. In the case of cloning, the workload dependency is resolved automatically.

Turning now to an example of applying the cloning technique to the Segment submodel. The master version of the Segment submodel maintains detailed information regarding the resident database blocks, and whether any of them were modified, and thus require a disk write before removal from main memory. Further, the master segment submodel maintains statistics that will be used by clones. For example, these statistics may include the number of times a requested block was found in memory and whether it was modified. The clone version of the Segment submodel does not maintain a detailed list of blocks in and out of memory. Instead, it peeks into the master segment submodel statistics and derives a probability function of whether the requested block is to be considered resident, and perhaps modified. Other than this internal detail, the clone segment submodel is identical to the master. In particular, master and clone submodels are identical in their external behavior. That is, the clone submodel will accept the same calls from the file system that the master accepts, and will issue the same calls to the Disk and the Scheduler as the master would. Therefore, the behavior of the segment submodel in a clone-AMP is identical to that in a master AMP, including interactions with other submodels. In this example, the clones have no side effects that require adjustment to other submodels. This is not so in general, as demonstrated by the example in the following section.

Figure 7:
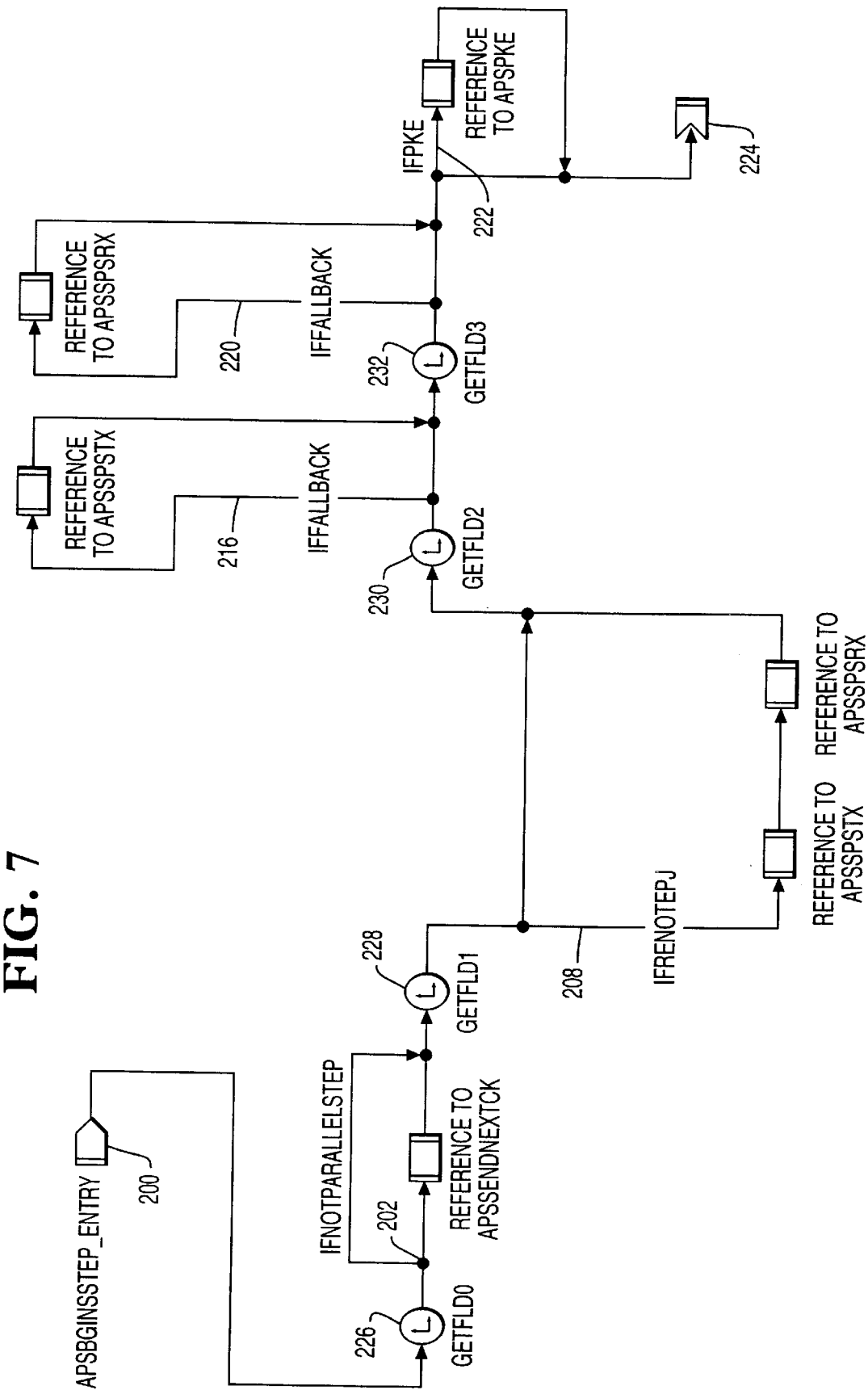
FIG. 7 shows a clone version of the Insert Step submodel shown in FIG. 4 in accordance with the preferred embodiment of the present invention.

Turning now to the cloning of Step Processing in AMPs as shown in FIG. 7, which would be particularly useful if the model user wishes to focus on Message or Ynet issues. Again, we reduce the detail in the clone Step Processing submodels. The master remains fully detailed, and maintains statistics that will be sampled by the clones. The clones in this case will not issue calls invoking the file system 108, scheduler 118, and journaling 110 submodels. Thus, in a clone AMP, a significant amount of detail is omitted to reduce model execution time. A clone Step Processing submodel issues all calls that its master issues to the message system 122. This in effect ensures that the clone AMP interaction with other AMPs remains similar to its interaction before Step Processing cloning. Thus, this aggregation process could be viewed as the cloning of an entire AAMP submodel.@ Since some clone submodel external behavior is modified, it may have side effects that must be rectified. Namely, there are resources (CPU, disk, etc.) that would normally be utilized as part of Step Processing and the clones must reflect that use. Specifically, since the calls to the file system 108 and journaling 110 submodels are not executed in a clone AMP, this will result in reduced utilization of the AMP's CPU 130 and Bus system 134, and in elimination of any utilization on the disk system 132 in a clone AMP. The bus 134 and the CPU 130 are accessed by other submodels, such as the Message 122 and Ynet Driver 124 submodels, which are running in full detail. Unless CPU 130 and bus 134 capacities are reduced by an amount representing the missing utilization, the CPU 130 and bus 134 will appear as faster resources to the Message 122 and the Ynet Driver 124 submodels.

Figure 8:
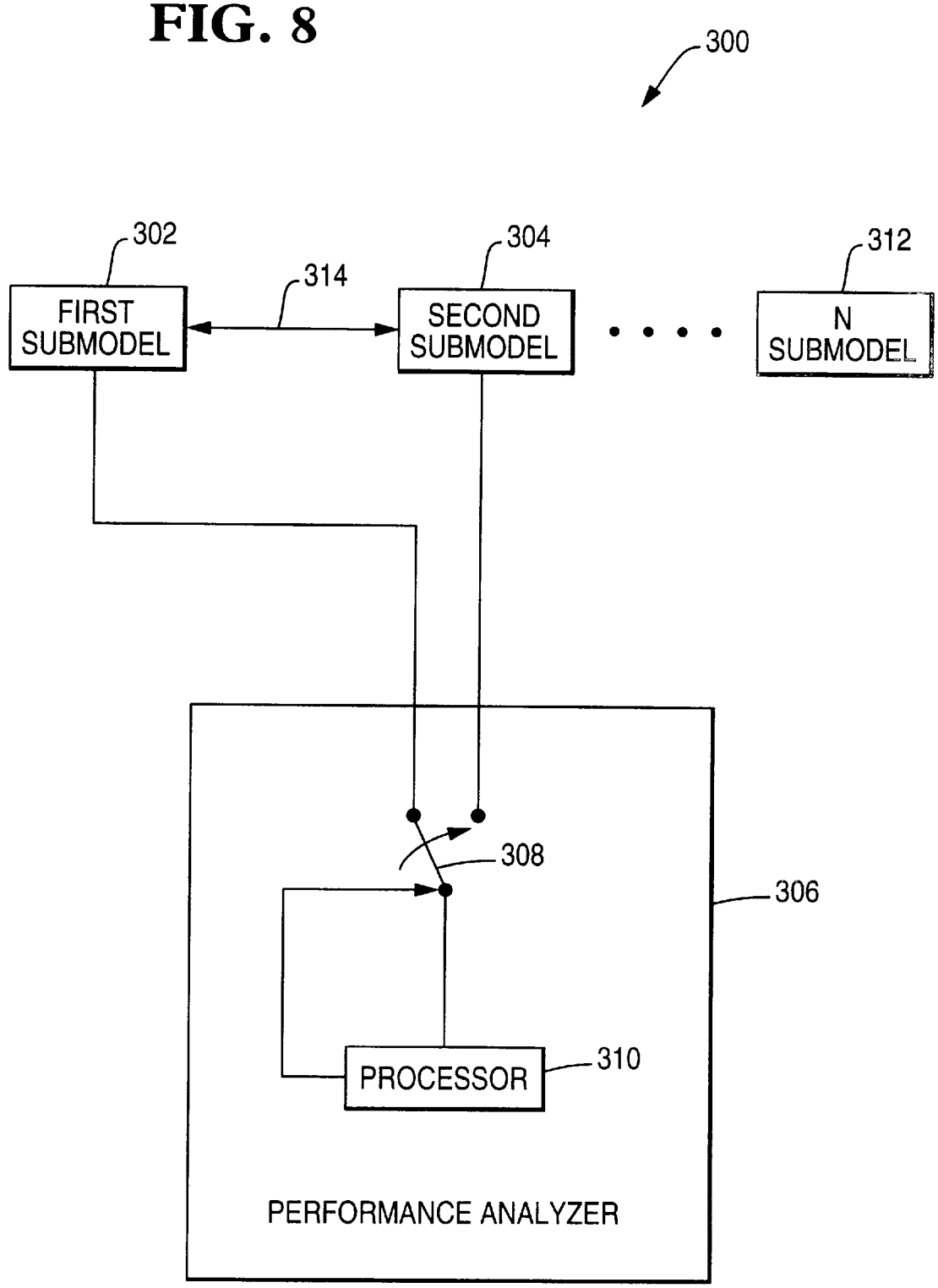
FIG. 8 shows a preferred embodiment computer performance modeling system in accordance with the present invention.

This cloning of the Step Processing in the DBC model can be readily implemented by constructing a detailed version and a clone version of each Step Processing submodel. A clone reduces the details representing processing operations (e.g., access to a data block, or a sort) to simple delays as shown in FIG. 8 for a clone version of the Insert Step submodel shown in FIG. 4. This clone may be implemented to include delay nodes in simulation tools like SES/ Workbench while at the same time retaining all details relating to communications such as the Message 122 sub-model calls. For each delay node (e.g., delay nodes 226, 228, 230, and 232), in a clone submodel, there exists an array of sample buckets which are updated round-robin fashion by the corresponding master submodel. Upon entering a delay node, a clone randomly selects one of the associated buckets for the node and delays for that length of time. In the Insert Step submodel, delay node 226 corresponds to the acquiring of a lock for the row being inserted function of element 202, delay node 228 corresponds to the accessing of the data block function of element 204, delay node 230 corresponds to the updating of the Transient Journal and insertion of the row into the data block 214 as well as the spawning of any tasks 216 as a Step to the fall back AMP functions of element 212 and 214, and delay node 232 corresponds to the update index tables function of element 218.

A configuration file defines Master and Clone clusters and their relationships. A master cluster is defined by a cluster id and its member AMP(s). A clone cluster is defined by its member AMP(s) and a list of the master clusters it is supposed to follow. The system model user can also define the number of sample buckets needed per delay node.

The more conventional aggregation technique can be illustrated by the aggregation of the Ynet submodels. The Ynet Driver 124 and the Ynet submodels 126 can be replaced with a simpler aggregate Ynet model. No master and clones arrangement is needed. Instead the entire Ynet subsystem is modeled by a single queue where all messages are posted and forwarded after some random time interval. The statistics for the random time interval may be obtained from analytic results, from benchmarks, or from a model run including detailed Ynet submodels. The aggregate Ynet model and the detailed model can be implemented as alternate paths in the same simulation tool submodels. As in the previous example, utilization of the CPU 130 and Bus systems 134 must be adjusted so that these resources present the appropriate capacity to the remaining detailed submodels.

It is essential that the overall system model needs to be calibrated to actual system benchmarks. Calibration is a time-consuming, iterative process that consists of bench marking the actual system, tuning model parameters, testing the model, and implementing indicated enhancements, if any. The actual system benchmarks may provide CPU path lengths of various APS and system software functions on the DBC. These path lengths provide input values to related model parameters. The model then needs to be run and its estimates for utilization of the CPU 130, disk 132 and Ynet 126 subsystems, request throughput and response times, etc., so that they can be compared to those gathered on the DBC. Any system model enhancements indicated by discrepancies may then be implemented and then calibration process is repeated.

A significant amount of statistics are gathered and categorized by workload type, and by node type is a system model simulation execution run. A set of tailorable reports which provide resource utilization, throughput, queue lengths, response times, and other items of interest can be generated after a simulation run. A sample report is shown in Table 2 below.

TABLE 2

```
*****************
* Model Config *
*****************
System Configuration Parameters are:
  Number of AMP Modules   = 24
  Number of Disks per AMP = 4
  Number of IFP Modules   = 8
  Detailed Network
  Detailed APS
  Master Group O consists of AMPS 1 - 24
*****************
* User Requests *
*****************
User Request O = TPCB
        Sessions = 1
User Request 1 = ProdJoin
        Sessions = 1
**********************
* Model Test Results *
**********************
*** A.  System Averaged (Per AMP) Statistics
    ------------------CPU-----------------  ------  ---------------------DISK----------------
            Prll                                     Prll
Time   Util  Eff   Krnl   Supv  User  QLen  Util  Eff  #R/s   KB/R  #W/s  KB/W
  6    59.6  99    29.8   8.9   20.9  0.06  2.2   18   2.27   5.2   0.00  0.0
 12    50.3  99    24.7   7.7   17.9  0.05  1.5   13   1.56   4.3   0.00  0.0
----------Ynet----------       ----Txns----
--Avg Qlen--                Resp
Util   MsgOt  BlkMg   Delay  Numb   Time
0.6    0.03   0.94    0.070  0.8    0.53
0.5    0.03   0.83    0.075  1.0    0.57
*** B.  System Averaged IFP Statistics
    -----------------CPU---------------        ----------YNet-----------------  -   ----Txns-----
           Pr11                                          --Avg Qlen--          Resp
Time   Util  Eff  Krnl  Supv  User  QLen  Util  MsgOt  BlkMg  Delay Numb  Time
  6    6.1   35   2.7   0.7   2.7   0.00  0.6   0.01   0.00   0.001 2.5   0.53
 12    6.5   50   2.8   0.8   2.9   0.00  0.5   0.01   0.00   0.001 2.9   0.57
*** C.  AMP Statistics Per Request
    -------------CPU------------        --------------------Disk--------------------
            Prll                                         Prll
Time    Request    Util  Eff  Krnl  Supv  User  Util  Eff  #R/s   KB/R  #W/s  KB/W
  6     TPCB       10.0  96   7.1   1.1   1.7   1.7   16   1.68   5.7   0.00  0.0
        ProdJoi    49.6  98   22.7  7.8   19.1  0.6   16   0.59   3.7   0.00  0.0
 12     TPCB       9.1   96   6.1   1.1   1.9   1.1   11   1.14   5.2   0.00  0.0
        ProdJoi    41.2  98   18.6  6.5   16.1  0.4   11   0.42   2.0   0.00  0.0
----------Ynet----------         ----Txns----
--Avg Qlen--                Resp
Util   MsgOt  BlkMg   Delay  Numb   Time
0.2    0.00   0.00    0.001  0.7    0.34
0.4    0.00   0.00    0.071  0.1    1.59
0.2    0.00   0.00    0.001  0.8    0.32
0.3    0.00   0.00    0.077  0.2    1.74
*** D.  AMP Statistics Per Step
----------------CPU--------------------------------DISK---------------------------
              Prll                                               Prll
      --Avg Qlen--
Time      Step              Util  Eff   Krnl  Supv  User  Util  Eff   #R/s  KB/R  #W/s  KB/W
  6    UPD_Customer   7.1   104   6.6   0.2   0.3   0.7   11    0.63  6.1   0.00  0.0
INS_txnHisto    0.6         18    0.1   0.3   0.2   0.3   5     0.26  6.9   0.00  0.0
UPD_Branch                  0.3   38    0.1   0.1   0.2   0.2   8     0.17  3.3   0.00  0.0
UPD_Teller                  0.3   26    0.1   0.1   0.2   0.2   9     0.20  3.7   0.00  0.0
SEL_Customer    0.1         23    0.0   0.0   0.1   0.3   7     0.24  7.0   0.00  0.0
EDT_ReadWrit    1.5         49    0.3   0.3   0.8   0.2   11    0.19  5.8   0.00  0.0
FTs_DistSJtb    48.9        98    22.5  7.7   18.7  0.5   13    0.48  4.1   0.00  0.0
JIN_selfjoin    0.2         57    0.1   0.0   0.1   0.1   6     0.10  2.0   0.00  0.0
EDT_ReadOnly    0.6         68    0.1   0.1   0.3   0.0   1     0.01  2.0   0.00  0.0
----------YNet----------
Util   MsgOt  BlkMg   Delay
0.1    0.00   0.00    0.00
0.0    0.00   0.00    0.00
0.0    0.00   0.00    0.00
0.0    0.00   0.00    0.00
0.0    0.00   0.00    0.00
0.0    0.00   0.00    0.00
0.4    0.00   0.00    0.07
0.0    0.00   0.00    0.00
0.0    0.00   0.00    0.00
*** E.  YNet (Per AMP) Statistics
 Util----------------Throughput---------------------------------  --        Delay
```

TABLE 2-continued

```
      in        Init    Cont
Time  pctg #W/s KB/W   Blk/s   Blk/s #R/s  KB/R           in
                                                          Rtx/s secs
6     0.6  16.4 0.11   19.1    0.5   322.0 0.10           2.72  0.070
12    0.5  14.4 0.12   16.6    0.5   267.5 0.11           2.19  0.075
------------------Queue Length------------------  --Ovrn/s--
-MsgOutQ-    -BlkMsgQ--   ---TNOQa--    --TNOQb--
Avg  Max    Avg  Max    Avg  Max    Avg  Max  HsRm   Chnl
0.03 2.33   0.94 2.00   0.00 1.33   0.00 1.00 0.0    2.8
0.03 2.29   0.83 2.00   0.00 1.29   0.00 1.00 0.0    2.4
*************************
* Model Execution Profile *
*************************
---------- TOTAL -------------------- PERCENT ----------
NAMECallsYieldsSecsCallsYieldsTime uSec
CpuExe79507817533611236.56731.1063.1339.801555
DskOperate1001110117.6340.040.400.257626
HostDriver18200.0000.010.010.000
HostQueue1821820.2220.010.010.011221
IoBusMove194180194180254.7747.606.998.201312
MsgBoxGet116400.5630.050.000.02483
MsgBoxLink115200.4670.050.000.02405
MsgBoxPut113700.6100.040.000.02537
```

The report format in Table 2 is designed to be similar to that of the DBC ResUsage Reports, the benchmark reports produced on the actual system. Table 2 shows excerpts from a sample run report in which the workload is composed of two request types: TPC-B, and Join. The report begins with the modeled configuration and workload, followed by performance results, then ends with a model execution profile section. Excerpts of performance statistics from five separate sections are included. Sections A and B present averaged CPU 130, Disk 132, and Ynet 126 utilization on AMPs and IFPs respectively. The average throughput and average response time of database requests are also shown in Section A. Section C shows AMP resource utilization by request type, while Section D shows the same utilization detailed by Step type. Section E contains various statistics relating to utilization, queue lengths, and the average transit delay of a message on the Ynet. The model execution profile section shows the number of calls, as well as time per call, for each submodel in the model. It will be appreciated by those skilled in the art that the model execution profile can be very effective in model debugging and in guiding efforts to minimize model execution time.

The foregoing discussion has presented an overview of the preferred embodiment DBC Performance Model developed to support the performance analysis of database, operating system, communication, and the hardware features of an existing MPP. An approach has been outlined for building a comprehensive and fairly detailed model to support large systems performance issues. Cloning and aggregation techniques in the system model submodels have also been described.

The preferred embodiment can be summarized in reference to FIG. 8 as a computer performance modeling system 300. A first submodel 302 simulates system operations of a particular system component (e.g., step processing component 112 of FIG. 2)in minute detail. A second submodel 304 simulates system operations of the same particular system component in simple detail. The first 302 and the second 304 submodel may simulate system operations such as workload, database management, operating system, communication, and/or hardware features. These system operations may specifically include: processor speed, memory capacity, disk capacity, access speed, as well as data transfer speed, network communcation speed, configurations of data paths between two or more parallel processors, and data path speed between various system parts. A performance analysis mechanism 306, having input ports connected to the first 302 and the second 304 submodel, executes a simulation of the particular system component using the first 302 and the second 304 submodel. The performance analysis mechanism 306 includes a switch 308 for switching between the first 302 and the second 304 submodel through processor 310 control during the simulation at a predetermined point in the execution of the simulation by the processor 310.

The first 302 and the second 304 submodel each preferably include substantially similar interfaces to other submodels of a system model such that these other submodels can be designed to pass information between either the first 302 or the second 304 submodel regardless of which submodel is currently being executed during a simulation.

The computer performance modeling system 300 preferably is designed in a layer structure which divides the system model into distinct modules. These layers may include, for example, an application support layer, a systems layer, and a hardware layer.

The performance analysis mechanism 306 preferably includes a cloning mechanism which uses several submodels (e.g., submodels 302, 304, and 312) in a system model simulation, including the first 302 and the second 304 submodels. The second submodel 304 acts as a clone by deriving a specific behavior from statistics collected during the simulation of the particular system component when the first submodel 302 is used.

Figure 9:
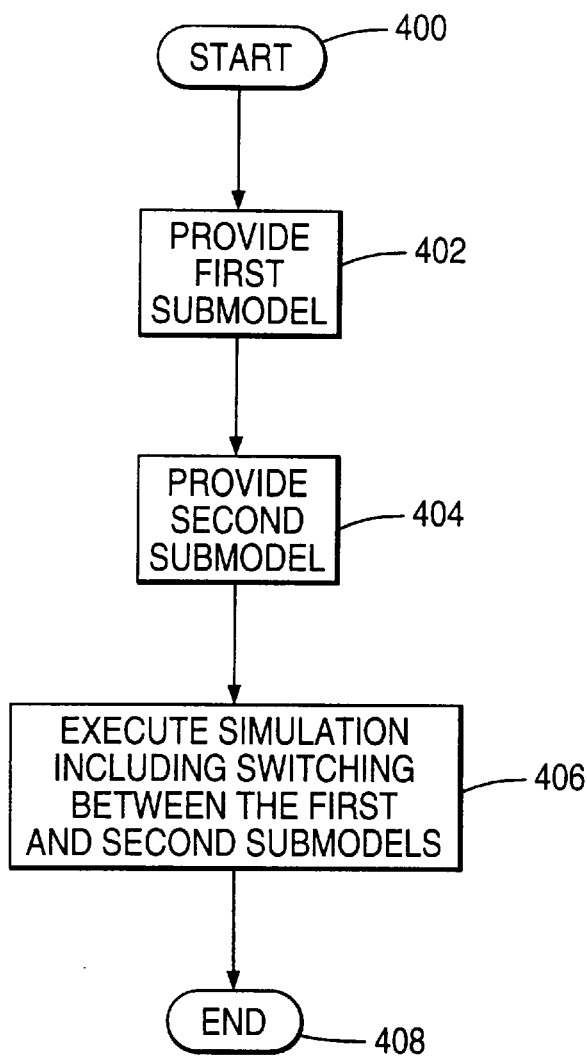
FIG. 9 shows a flowchart detailing a preferred embodiment method of operating the computer performance modeling system of FIG. 8 in accordance with the present invention.

This preferred embodiment of the invention may also be described in reference to device-implemented method steps 400–408 of modeling computer performance shown in FIG. 9 which detail preferred embodiment operations of the computer performance modeling system 300 as shown in FIG. 8. This method includes the steps of providing a first submodel 402 which simulates system operations of a particular system component in minute detail and providing a second submodel 404 which simulates system operations of the particular system component in simple detail. Subsequently, a simulation of the particular system component is executed 406 using the first and the second submodel by switching between the first and the second submodels during the simulation at a predetermined point in the execution of the simulation.

An alternative preferred embodiment also can be summarized in reference to FIG. 8 as a computer performance modeling system 300 in the following manner. A master submodel 302 simulates system operations of a particular system component in minute detail. Also, two or more clone submodels 304 and 312 simulate system operations of the particular system component in simple detail. Each clone submodel 304 and 312 derives a specific behavior from simulation statistics collected by the master submodel 302 and passed through a communication link 314. These simulation statistics are related to system operations such as workload, database management, operating system, communication, and/or hardware features. A performance analysis mechanism 306, having input ports connected to the master 302 and the clone 304 and 312 submodels, executes a simulation of a system model having a number of the particular system components by using a corresponding number of the clone submodels 304, 312 and at least one master 302 submodel.

Like the first aspect of the invention, the master 302 and the clone 304 and 312 submodels, in this alternative description of the present invention, each preferably include substantially similar interfaces to other submodels of a system model such that these other submodels can be designed to pass information between either the master 302 or the clone 304 or 312 submodel regardless of which submodel is currently being executed during a simulation. In addition, the computer performance modeling system 300 preferably is designed in a layer structure which divides the system model into distinct modules.

The performance analysis mechanism 306 preferably includes a switch 308 which switches under processor 310 control between the master 302 and one of the clone 304 or 312 submodels during the simulation at a predetermined point in the execution of the simulation by processor 310.

The computer performance modeling system 300 may also include another master submodel (not shown), distinct from the master submodel 302, which similates system operations of the particular system component in minute detail. Each of the master submodels simulates the same system operations while having different operating conditions parameters such that each clone submodel 304 derives a specific behavior from simulation statistics collected by either master submodel. For example, each master submodel could simulate the access speed of a disk drive. One of the master submodels might simulate operations in minute detail when the disk drive is near maximum loading capacity (i.e., almost full). The other master submodel would then simulate operations in minute detail when the disk drive is lightly loaded (i.e., almost empty).

Figure 10:
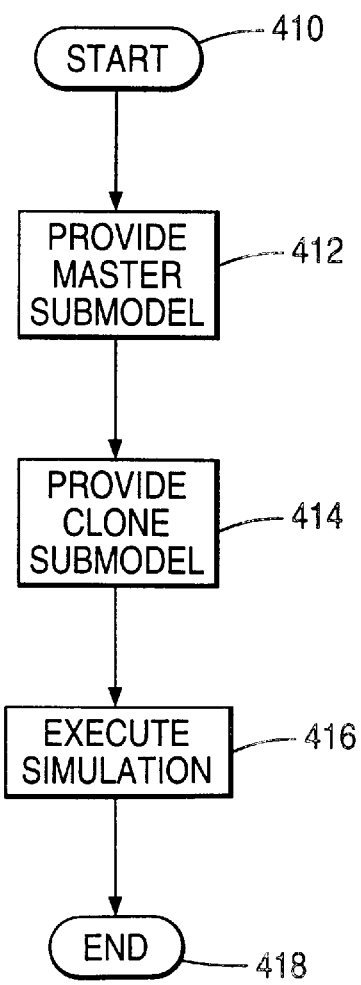
FIG. 10 shows a flowchart detailing an alternative preferred embodiment method of operating the computer performance modeling system of FIG. 8 in accordance with the present invention.

This alternative preferred embodiment of the invention may also be described in reference to device-implemented method steps 410–418 of modeling computer performance shown in FIG. 10 which detail preferred embodiment operations of the computer performance modeling system 300 as shown in FIG. 8. This method includes the steps of providing a master submodel 412 which simulates system operations of a particular system component in minute detail and providing a plurality of clone submodels 414 which simulate system operations of the particular system component in simple detail. Each clone submodel derives a specific behavior from simulation statistics collected by the master submodel. These simulation statistics are related to system operations such as workload, database management, operating system, communication, and/or hardware features. Subsequently, a simulation of a system model is executed 416 having a number of the particular system components by using a corresponding number of the clone submodels and at least one master submodel.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of shape, size and arrangement of parts within the principles of the present invention to the full extent indicated by the broad general meaning of the terms in which the appended claims are expressed.

What is claimed is:

1. Computer performance modeling system having a plurality of layers which divide the system model into distinct modules, comprising:

(a) first submodel means for simulating system operations of a particular system component in a first level of detail;

(b) second submodel means for simulating system operations of the particular system component in a second level of detail;

(c) performance analysis means, operatively coupled to the first and second submodel means, for executing a simulation of the particular system component using the first and the second submodel means, the performance analysis means comprising switching means for switching between the first and second submodel means during the simulation at a predetermined point in the execution of the simulation;

wherein the first and the second submodel means each include substantially similar interfaces to other submodels of a system model, and wherein the plurality of layers include an application support layer, a systems layer, and a hardware layer.

2. The computer performance modeling system of claim 1, wherein the first and the second submodel means simulate system operations selected from the group consisting of workload, database management, operating system, communication, and hardware features.

3. A method of modeling computer performance comprising the steps of:

(a) providing a first submodel which simulates system operations of a particular system component in a first level of detail;

(b) providing a second submodel which simulates system operations of the particular system component in a second level of detail; and (c) executing a simulation of the particular system component using the first and second submodel by switching between the first and second submodels during the simulation at a predetermined point in the execution of the simulation;

wherein the first and the second submodel means each include substantially similar interfaces to other submodels of a system model, and wherein the model comprises a plurality of layers which divide the system model into distinct modules, the plurality of layers including an application support layer, a systems layer, and a hardware layer.

4. A program storage device readable by a computer tangibly embodying a program of instruction executable by the computer to perform method steps of modeling computer performance, the method comprising the steps of:

(a) providing a first submodel which simulates system operations of a particular system component in a first level of detail;

(b) providing a second submodel which simulates system operations of the particular system component in a second level of detail; and (c) executing a simulation of the particular system component using the first and the second submodel by switching between the first and the second submodels during the simulation at a predetermined point in the execution of the simulation;

wherein the first and the second submodel means each include substantially similar interfaces to other submodels of a system model, and wherein the model comprises a plurality of layers which divide the system model into distinct modules, the plurality of layers including an application support layer, a systems layer, and a hardware layer.

5. The method of claim 3, wherein the first and the second submodel means simulate system operations selected from the group consisting of workload, database management, operating system, communication, and hardware features.

6. The program storage device of claim 1, wherein the first and the second submodel means simulate system operations selected from the group consisting of workload, database management, operating system, communication, and hardware features.

* * * * *